US008331977B2

(12) United States Patent  
Douglas et al.

(10) Patent No.: US 8,331,977 B2
(45) Date of Patent: Dec. 11, 2012

(54) RAPID SEARCH FOR OPTIMAL WIRELESS NETWORK CONFIGURATION

(75) Inventors: Bretton Douglas, San Jose, CA (US); Timothy Olson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/367,525

(22) Filed: Feb. 7, 2012

(65) Prior Publication Data

US 2012/0134290 A1 May 31, 2012

Related U.S. Application Data

(62) Division of application No. 12/322,005, filed on Jan. 27, 2009, now Pat. No. 8,140,104, which is a division of application No. 10/933,102, filed on Sep. 2, 2004, now Pat. No. 7,502,617.

(51) Int. Cl.
*H04B 7/00* (2006.01)

(52) U.S. Cl. ............ 455/522; 455/69; 455/70; 455/63.1; 455/67.11; 455/450

(58) Field of Classification Search .................. 455/522, 455/69–70, 63.1, 67.11, 450–455
See application file for complete search history.

(56) References Cited

U.S. PATENT DOCUMENTS

| 5,878,328 | A | 3/1999 | Chawla et al. |
| 6,208,629 | B1 * | 3/2001 | Jaszewski et al. ............ 370/329 |
| 6,311,067 | B1 | 10/2001 | Sammour et al. |
| 6,317,599 | B1 | 11/2001 | Rappaport et al. |
| 6,498,934 | B1 | 12/2002 | Muller |
| 6,499,006 | B1 | 12/2002 | Rappaport et al. |
| 6,625,454 | B1 | 9/2003 | Rappaport et al. |
| 6,810,255 | B2 | 10/2004 | Chen et al. |
| 7,167,696 | B2 | 1/2007 | Backes et al. |
| 7,346,321 | B2 | 3/2008 | Backes |
| 7,911,993 | B2 | 3/2011 | Proctor et al. |
| 2003/0086393 | A1 | 5/2003 | Vasudevan et al. |
| 2004/0121749 | A1 | 6/2004 | Cui et al. |
| 2005/0090241 | A1 | 4/2005 | Backes et al. |
| 2006/0025150 | A1 * | 2/2006 | Kim et al. ............ 455/453 |

OTHER PUBLICATIONS

Scalable Networks Press Release, May 12, 2004, http://www.scalable-networks.com/new/press/pressreleases13.php.
Scalable Networks Product Description for Product announced on May 12, 2004 http://www.scalable-networks.com/products/qualnet_wifi.php.
LANPlanner SE Product Brochure, Wireless Valley, 2404 Rutland Drive, Suite 700, Austin, Texas 78758, Jan. 2004.

* cited by examiner

*Primary Examiner* — Fayyaz Alam
(74) *Attorney, Agent, or Firm* — Cindy Kaplan

(57) ABSTRACT

A search algorithm to find a globally optimal radio plan for a wireless network, including assignments of frequency and transmission power to multiple access points. Two different evaluation metrics are used in order to provide an optimal solution in a reasonable time period. Frequency searches are performed using a special rapid evaluation metric. Transmission powers are selected using a more refined metric that estimates data throughput. The search results are deterministic and execution time is also substantially deterministic.

20 Claims, 15 Drawing Sheets

| NL | 109 | 71 | 103 | 106 | NL | 74 | 85 | 101 |
|----|-----|----|-----|-----|----|----|----|-----|
| 108 | NL | 92 | 91 | 95 | 81 | 104 | 103 | 87 |
| 73 | 91 | NL | 90 | 110 | 105 | 88 | 83 | 81 |
| 103 | 93 | 90 | NL | 101 | 85 | 96 | 76 | 87 |
| 106 | 94 | 111 | 104 | NL | 105 | 96 | 108 | 90 |
| 110 | 85 | 108 | 88 | 104 | NL | 110 | 94 | 90 |
| 78 | 108 | 89 | 99 | 98 | 112 | NL | 96 | 91 |
| 89 | 103 | 87 | 79 | 109 | 94 | 97 | NL | 92 |
| 101 | 87 | 85 | 88 | 92 | 89 | 90 | 91 | NL |

FIG. 5A

| NL | 109 | _71_ |
|----|-----|----|
| 108 | NL | 92 |
| _73_ | _91_ | NL |

FIG. 5B

| NL | 101 | _85_ |
|----|-----|----|
| 104 | NL | 105 |
| _88_ | 104 | NL |

FIG. 5C

| NL | 96 | _91_ |
|----|----|----|
| 97 | NL | 92 |
| _90_ | _91_ | NL |

FIG. 5D

RAPID SEARCH FOR OPTIMAL WIRELESS NETWORK CONFIGURATION

STATEMENT OF RELATED APPLICATIONS

The present application is a divisional of U.S. patent application Ser. No. 12/322,005, filed Jan. 27, 2009, which is a divisional of U.S. Pat. No. 7,502,617, filed Sep. 2, 2004, the contents of which are incorporated by reference herein for all purposes.

The present application is related to the subject matter of U.S. application Ser. No. 10/791,466 filed on Mar. 1, 2004, entitled "QUALITY EVALUATION FOR WIRELESS COMMUNICATION NETWORKS," the contents of which are herein incorporated by reference for all purposes.

BACKGROUND

The present invention relates to wireless communication networks and, more particularly to systems and methods for planning wireless communication networks.

Wireless communication networks such as wireless local area networks (LANs) may serve a multitude of client devices using multiple access points. The network planner seeks to have the network provide attributes such as ubiquitous coverage, high throughput, etc. Network parameters that may be adjusted in seeking to achieve these objectives include the transmission frequency and power of each access point. Finding an optimal set of network parameters for an even relatively modestly scaled network is a non-trivial problem. Consider, for example, an IEEE 802.11b network that includes 10 access points. Each access point can be assigned to one of three possible channels and one of six possible power levels. Thus each access point has 18 possible configurations. This network would therefore have $18^{10}$ or approximately 3.6 trillion possible configurations. An exhaustive search of each possible configuration would take an extremely long time considering that some sort of quality metric must be evaluated for each considered configuration.

What is needed are efficient systems and methods for searching through the large number of possible configurations in order to find a globally optimal radio plan. It is also desirable that the results be deterministic based on the inputs to facilitate testing and debugging. It is further desirable that the execution time be substantially deterministic. These desired deterministic attributes rule out genetics algorithms and annealing algorithms as known in the art.

SUMMARY

Embodiments of the present invention provide a search algorithm to find a globally optimal radio plan for a wireless network, including assignments of frequency and transmission power to multiple access points. Two different evaluation metrics are used in order to provide an optimal solution in a reasonable time period. Frequency searches are performed using a special rapid evaluation metric. Transmission powers are selected using a more refined metric that estimates data throughput. The search results are deterministic and execution time is also substantially deterministic.

A first aspect of the present invention provides a method for assigning transmission frequencies and transmission power levels to a plurality of access points in a wireless network. The method includes a) evaluating a first evaluation metric for a first subset of possible frequency assignments to said plurality of access points wherein said first evaluation metric counts a number of pairs of said access points that contend on the same frequency; b) for a plurality of frequency assignments ranked best in said a) step, evaluating a second evaluation metric for all possible assignments of transmission power; c) identifying a mean transmission power for a plurality of transmission powers ranked best in said b) step; d) based on said mean transmission power, evaluating said first evaluation metric for a second subset of possible frequency assignments, said second subset being larger than said first subset; and e) for a plurality of frequency assignments ranked best in said d) step, evaluating said second evaluation metric for all possible assignments of transmission power.

A second aspect of the present invention provides a method of assessing communication quality in a wireless network comprising a plurality of access points. The method includes: receiving as input path loss information indicating path losses among pairs of said access points and frequency assignments for said access points, determining for each pair of access points likelihood of contention based on path loss between said pair and whether they share a common frequency assignment, and counting a number of contending pairs of access points to determine a quality evaluation metric for said wireless network.

A third aspect of the present invention provides a method for assigning transmission frequencies and transmission power levels to a plurality of access points in a wireless network. The method includes: applying a first evaluation metric to reduce the solution space of power and frequency assignments and applying a second evaluation metric to find a best set of power and frequency assignments.

Further understanding of the nature and advantages of the inventions herein may be realized by reference to the remaining portions of the specification and the attached drawings.

BRIEF DESCRIPTION OF THE DRAWINGS

FIGS. 5A-5D depict information used by a fast evaluation metric according to one embodiment of the present invention.

DESCRIPTION OF SPECIFIC EMBODIMENTS

The present invention will be described with reference to a representative wireless network that employs one of the IEEE 802.11 standards such as, e.g., 802.11a, 802.11b, 802.11g, or currently envisioned standards such as 802.11n. All of the documents defining these standards are incorporated herein by reference in their entirety for all purposes. In the example discussed herein, a region to be covered by a wireless network is divided into cells with each cell having an access point. Clients are associated with a particular access point and can communicate to and from the network via that access point.

Figure 1:
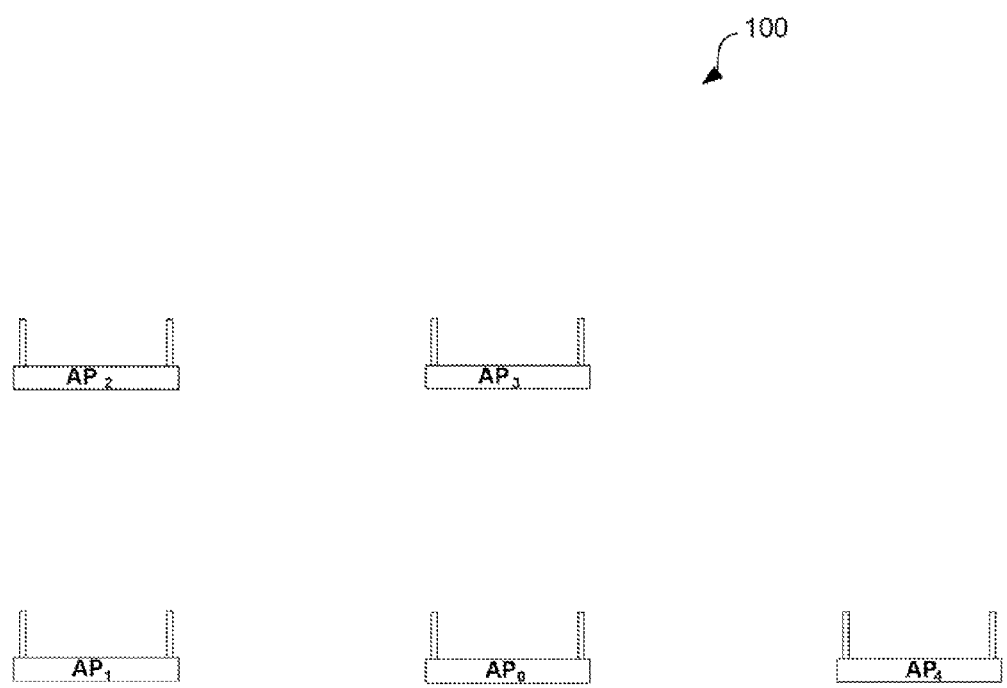
FIG. 1 depicts a representative wireless communication network to which embodiments of the present invention may be applied.

FIG. 1 depicts a representative wireless communications network 100 to which embodiments of the present invention may be applied. There are five access points, $AP_0$ through $AP_5$. Each access point may have numerous associated clients (not shown). Development of a radio plan or configuration for this network 100 in FIG. 1 will include an assignment of a transmission channel and transmission power to each access point. For example, in an 802.11b or 802.11g network, there may be three channels employed, 1, 6, and 11. Each of the access points in network 100 will be assigned one of channels 1, 6, and 11. Others schemes employ four channels, such as 1, 4, 7, and 11 or 1, 4, 8, and 11. There may be six different transmission power levels, for example, ranging from 0 dBm to 20 dBm for 802.11b access points and from 0 dBm to 15 dBm for 802.11a/g access points.

The goal of a radio planning algorithm is to find the access point settings that provide the best possible solution. An ideal solution is one that provides high overall network throughput, complete coverage of a particular space, and relatively even loading on the access points. Embodiments of the present invention make use of two different evaluation metrics to assess the quality of possible solutions. One evaluation metric is referred to as a "combined metric" and has been previously described in U.S. patent application Ser. No. 10/791,466. This metric considers factors such as contention and collision among access points and clients, traffic load, the physical space to be covered, etc. The input to the combined metric includes path losses between the access points as well as the frequency and power settings of the access points.

The combined metric requires sufficient computation time that it is not feasible to evaluate it for every possible solution even for a relatively small number of access points. Accordingly, embodiments of the present invention further provide a fast evaluation metric that can be computed much more quickly. The fast evaluation metric takes into account similar inputs and provides the number of access point pairs that contend given a set of assignments of transmission power and frequency. This is a readily computed measure of network quality with lower values indicating higher quality.

Assume a wireless network that includes M access points, N possible frequencies for each access point, and P possible transmission power levels for each access point. The problem then is finding the best possible frequency/power plan out of $(N*P)^M$ possible plans. Certain embodiments of the present invention split the process of finding the best possible plan into essentially three steps:

1. Finding the Q best frequency plan(s) out of $N^M$ possible combinations while making simplifying assumptions about power levels.

2. Finding the R best frequency/global power plans (i.e., all access points have the same power level) out of (Q*P) combinations.

3. Finding the best frequency/power plans by adjusting the power in the R best frequency/global power plans one access point at a time.

Figure 2:
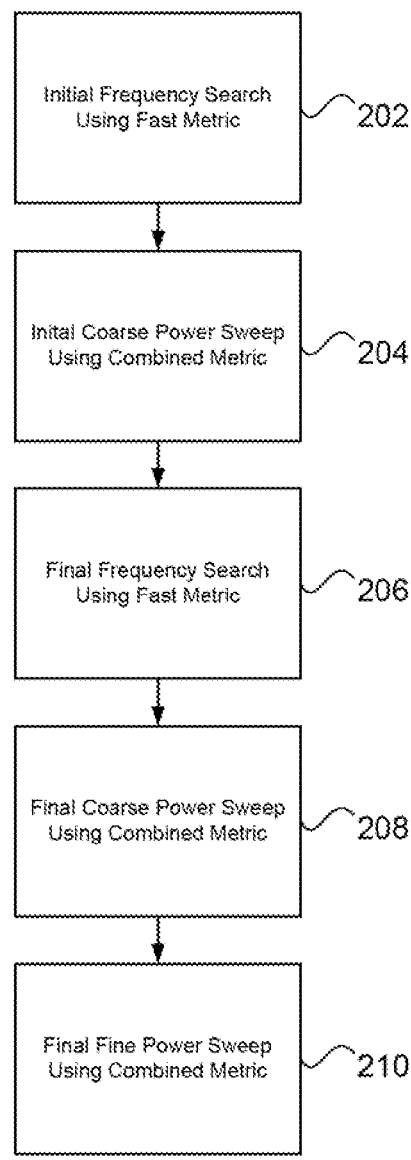
FIG. 2 is a flowchart describing steps of searching for an optimal network configuration according to one embodiment of the present invention.

FIG. 2 is a flowchart describing steps of finding a global optimal radio plan in greater detail. A step 202 begins the search algorithm by performing an initial frequency search. A subset of possible frequency plans are evaluated using the fast metric. An example calculation of the fast evaluation metric will be presented in detail below. At a general level, however, the fast evaluation metric operates by counting pairs of contending access points. For each pair of access points determining whether they contend involves consideration of the transmission power, path loss, and receiver sensitivity. For example, for a receiver sensitivity of −92 dBm, when the access points are transmitting at 20 dBm, if the path loss is less than 112 dB between any pair of access points, they will contend for the channel. For the same receiver sensitivity, when the access points are transmitting at 0 dBm, if the path loss is less than 92 dB between any pair of access points, they will contend for the channel. The determination of whether two access points contend can be understood as a comparison of the path loss to a path loss threshold equivalent to the transmission power minus (in logarithmic terms) the receiver sensitivity.

For step 202, power levels have not been selected so a surrogate path loss threshold is preferably used. Possible threshold settings for step 202 include:

1. The mean of the maximum and minimum transmit powers minus the receiver sensitivity.

2. The mean path loss for all detected links.

3. The median path loss for all detected links.

4. Sort the path loss data and use order statistics, i.e., select a surrogate threshold that is some multiple of the standard deviation above or below the mean.

The fast evaluation metric is evaluated for a relatively small subset (typically 100 to 1000) of the possible set of frequency assignments. To facilitate selection of particular frequency combinations for evaluation by the fast metric, each channel is given a unique channel index and each combination of access point channel assignments is given a solution index as will be explained. If there are three possible channel assignments to any particular access point, then there are three possible channel index values (0, 1, and 2). If there are four possible channel assignments to any particular access point, then there are four possible channel indices (0, 1, 2, or 3). In one possible 802.11b/g implementation, the channel indices would be:

| Channel Index | 802.11b/g Channel |
|---|---|
| 0 | 1 |
| 1 | 6 |
| 2 | 11 |

Each combination of frequency assignments to access points can be assigned a unique solution index. The solution index may be derived by use of the following equation:

$$\sum_{k=1}^{M} N^{k-1} C_k$$

where M is a number of different access points, N is the number of different channel indices, and $C_k$ is the channel index of the channel assigned to access point k. For example, if there are nine access points and three possible channel assignments for each access point, the minimum solution index would be 0 and the maximum solution index would be 19682 for a total of 19683 different solution indices.

Figure 3:
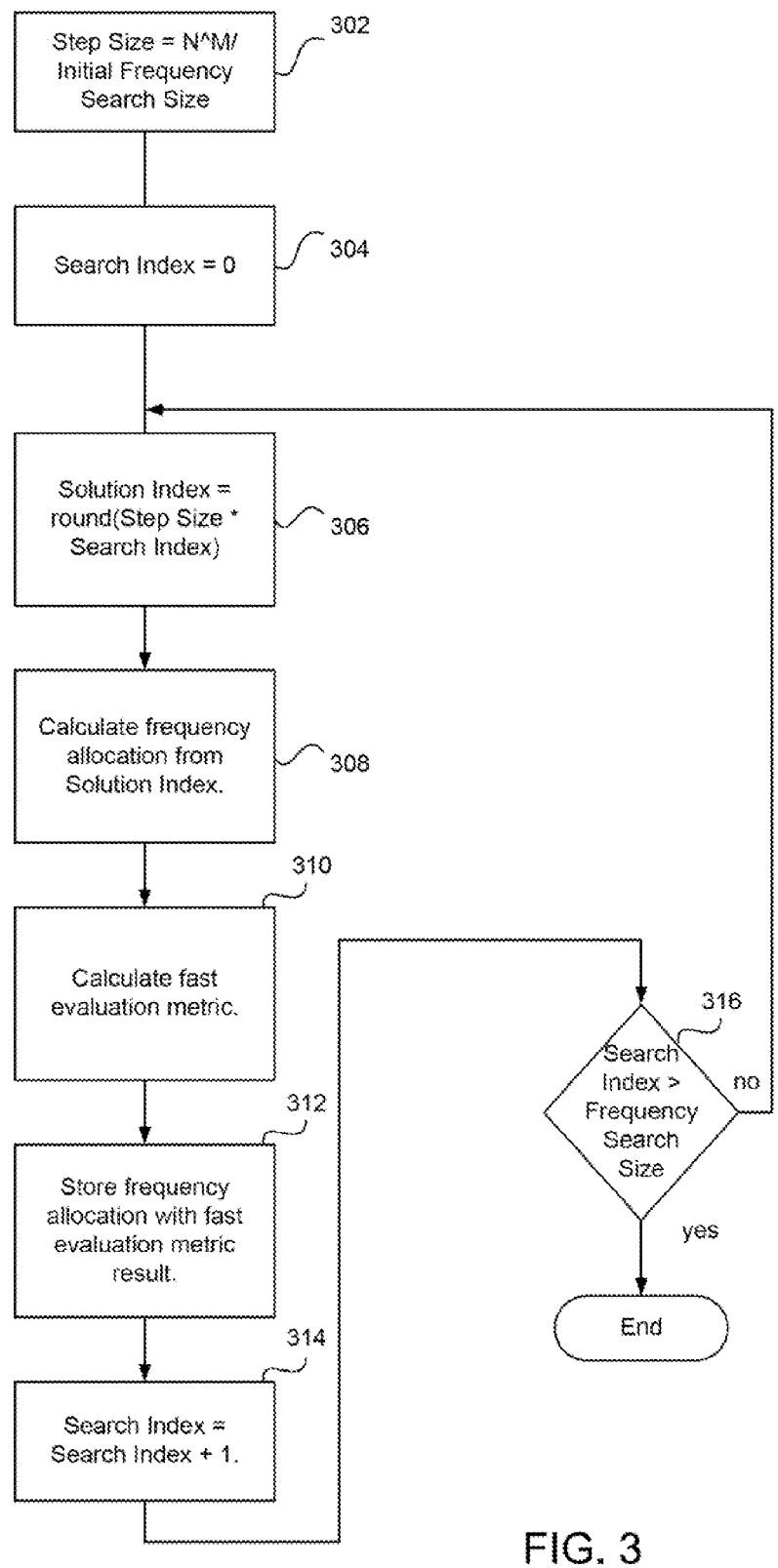
FIG. 3 is a flowchart describing details of a frequency search according to one embodiment of the present invention.

FIG. 3 depicts further details of the frequency search according to one embodiment of the present invention. At step 302, the step size to be used in stepping through the solution indices is calculated as N/Initial Frequency Search Size. The Initial Frequency Search Size is either a predefined parameter or is derived from a maximum tolerable execution time. If the step size turns out to be a power of N, the step size is modified to be:

Step Size=$N*M$/(Initial Frequency Search Size+1)

This modification prevents the search from repeatedly assigning the same frequency to some of the access points.

At step 304, the search index is set to 0. A step 306 begins a loop through the solution index values. Step 306 computes:

Solution Index=round(Step Size*Search Index)

A step 308 then determines the frequency allocation based on the solution index value computed in step 306, thus determining the channel assigned to each access point. A step 310 then calculates the fast evaluation metric value for the frequency allocation found in step 308. In one implementation, the path loss threshold used is the mean path loss of all links among access points. A step 312 then stores the frequency allocation along with the fast evaluation metric result of step 310. A step 314 increments the value of the search index. A step 316 then tests the termination condition for the loop by comparing the search index to the Frequency Search Size. If the search index is greater than the Frequency Search Size, then the procedure terminates. Otherwise, execution returns to step 306.

A small number of the best solutions found in the iterations of step 310 are retained, e.g., typically 1% to 10%. These retained solutions are then the search space for an initial coarse power sweep at step 204. The initial coarse power sweep uses the combined metric. For each frequency solution found in step 202, the power level on all the access points is swept over the possible transmit powers. For this coarse power sweep, the power levels on all of the access points are assumed to be the same. The combined metric is evaluated for all such frequency and power combinations. The ten frequency/power plans that provide the highest combined metric are used for determining a path loss threshold. This path loss threshold is then used in a further frequency search at step 206.

The final frequency search of step 206 employs the fast evaluation metric again. The path loss threshold is obtained by evaluating the mean of the powers of the best frequency/power plans identified by the coarse power sweep of step 204 and subtracting the receiver sensitivity. The final frequency search of step 206 is similar in many respects to the frequency search of step 202. However, a much larger number of frequency combinations will be searched, typically 5,000 to 20,000 rather than the 100 to 1,000 used in step 202. If the total number of possible solutions, $N^M$ is relatively small, then the final frequency search will check every possible frequency combination.

Where there is a very large number of access points, e.g., when the number of frequency assignment combinations is such that even a search space of 20,000 combinations would involve a step size of greater than $2^{32}$, a different technique is used. This technique divides the access points into frequency scan groups and then optimizes the scan groups in succession, preserving the best combinations from the cumulative optimization obtained from the previous scan groups.

The scan groups are obtained as follows:

1.) Start with the list of access points to be configured. Some access points may have location information (building, floor, and coordinates on floor) and some may not.

2.) Loop through each floor to create frequency scan groups. A frequency scan group is kept small enough so that the frequency search step size is less than a 32-bit integer.

3.) Starting with the access points that do have location information select an access point from the edge of the floor and add it to a new frequency scan group.

4.) Continue adding access points to the frequency scan group from the same floor by repeatedly selecting access point with the smallest path loss to any access point in the group.

5.) If a frequency scan group is full (e.g., 20,000 assignment combinations can be checked with a 32 bit step size), then create a new scan group and add the access point from step 4 to the group. Continue adding access points to the scan group as described in step 4.

6.) Once the access points on the floor have all been placed in a scan group move to the next floor. Continue to add access points as described in step 4.

7.) For the access points without location information, choose an access point randomly and add it to a new frequency scan group.

8.) Continue to add access points to the scan group based on the smallest path loss to any access point currently in the group.

9.) If a frequency scan group is full, then create a new scan group. Continue until all access points are in a scan group.

Now all of the access points have been separated into scan groups. An incremental optimization procedure is followed:

10.) Select a first one of the scan groups for optimization.

11.) Perform a fast evaluation metric calculation over, e.g., 5000 to 20000, of the assignment combinations in the first scan group in the manner described with reference to step 202. Contention with access points in scan groups that have not yet been optimized is not considered.

12.) Move onto the next scan group. Preserve e.g., the 5-20 best assignment combinations of the previous optimization and combine them with e.g., 5000 to 20000, of the assignment combinations in the current scan group. The previous best assignment combinations are used to evaluate contentions between the currently evaluated scan group and the previously evaluated scan group.

13.) Repeat step 12.) for all of the scan groups.

The best resulting frequency combination assignments are the input to step 208.

A step 208 performs a final coarse power sweep again using a combined metric. A handful, e.g., 5-20, frequency combinations identified as best in step 206 are used in this final coarse power sweep. Again, as in step 204, all of the powers are swept together and the combined metric is used for evaluation. Step 208 retains the best combined evaluation metrics and the power/frequency settings that produced them.

Figure 4:
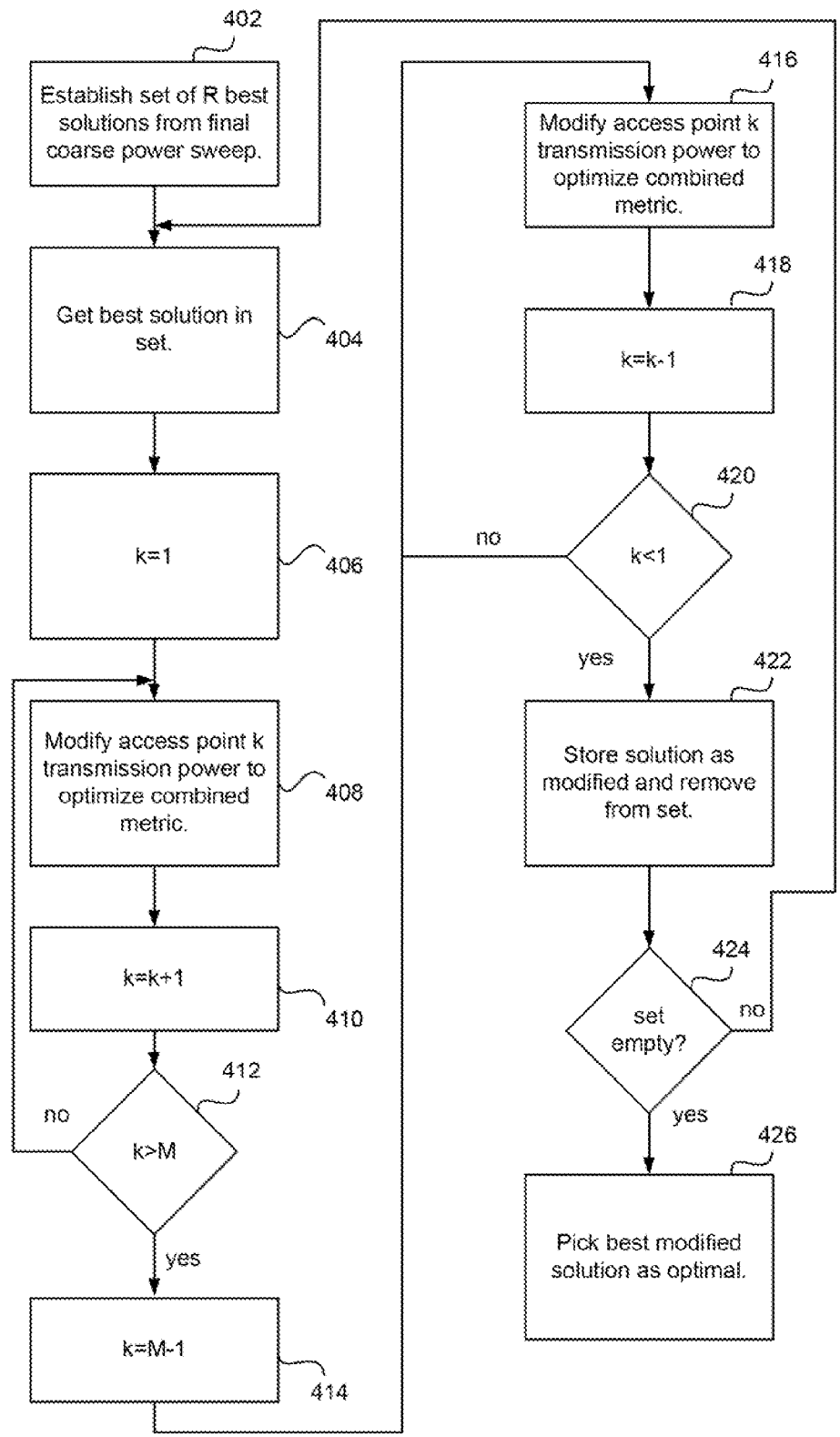
FIG. 4 is a flowchart describing steps of a fine power sweep according to one embodiment of the present invention.

A final fine power sweep is performed using the combined metric at step 210. Up until now, the power settings have been held the same for all the access points, but step 210 adjusts them individually. Further details of the fine power sweep will be described with reference to FIG. 4. In FIG. 4, a step 402 establishes a set of R best solutions from the final coarse power sweep of step 208. A step 404 retrieves the best solution in that set. A step 406 sets an index variable k to be equal to 1. The index variable k will identify a particular access point.

A step 408 begins a loop. At step 408, the transmission power of access point k is modified to optimize the combined metric value derived from all the access points. The access point k transmission power is varied starting at the initial value provided by the coarse power sweep solution. In one implementation, the execution of step 408 is accelerated by searching for a local maximum as the access point k transmission power is modified. If as access point k transmission power varies, the combined metric value increases and then decreases, a local maximum is identified and it is assumed that this local maximum is the optimal Value of access point k transmission power at this point in the algorithm.

A step 410 increments the index variable k. Then a step 412 tests whether k is greater than M. If k is greater than M, then execution returns to step 408 to modify the transmission power of the next access point while retaining the modifications made in previous iterations. If k is not greater than M, then step 414 is reached and the access points are stepped through again in reverse order.

A step 416 modifies the access point k transmission power to optimize the combined metric as was done in step 408. A step 418 decrements the index variable k. A step 420 tests whether all of the access points have been processed a second time by checking whether k is less than 1. If k is not less than 1, then processing returns to step 416 to consider the next access point. If k is less than 1, then the solution is stored at step 422 with all of the final individual access point power level modifications. Also, this particular solution is then removed from the set established in step 402.

A step 424 tests whether the set is empty indicating that all of the solutions from the final coarse power sweep have been subject to the individual access point transmission power adjustments. If the set is not empty, then processing returns to step 404 to begin performing the individual access point power modifications on the next best solution in the set obtained from the final coarse power sweep. If step 424 determines the set to be empty, then the best of the solutions stored at the iterations of step 422 is picked as the best overall frequency and power assignment at step 426.

A wireless configuration server can then load the frequency and power assignments into the respective access points. Thereafter the wireless network operates in accordance with the selected configuration.

Fast Evaluation Metric

The fast evaluation metric assumes that the dominant source of capacity degradation is access point to access point contention. The degree of access point to access point contention depends upon the transmit power of the access points. If the transmitted signal from one access point is received at another access point at a level higher than the receiver sensitivity, it will cause that second access point to wait for the channel to clear before it transmits its information. This behavior can also be thought of in terms of a path loss threshold. To determine if access points contend one compares the path loss between them to that threshold. The fast evaluation metric result then is a count of the number of access point pairs that contend on each channel.

Evaluation of the fast metric will be described in greater detail with reference to FIGS. 5A-5D. FIG. 5A depicts a path loss matrix giving the path loss of each possible pairing among nine access points, each having a transmitter and a receiver. Each row corresponds to a particular access point transmitter and each column corresponds to a particular access point receiver. Each entry gives the path loss for the access point pair denoted by the row and column of the entry. The nomenclature "NL" indicates that there is no link between the two access points. In some instances there is a difference between the measured path losses in each direction for the same two access points due to differences in receiver calibration.

For FIG. 5A, assume that the first three managed access points corresponding to the first three columns and the first three rows are assigned to channel 1, the next three managed access points are on channel 6, and the last three managed access points are on channel 11. For this example, assume that all of the access points are transmitting at minimum power, 0 dBm, that the sensitivity is −92 dBm, and that the path loss threshold is thus 92 dB. When the path loss exceeds 92 dB, then there is no contention. If the path loss exceeds 92 dB, then contention is present.

FIG. 5B shows the path losses among the access points on channel 1. In FIG. 5B, the underlined values indicate path losses that fall below the path loss threshold and thus indicate contention. As can be seen, there are three access point pairs that result in contention. FIG. 5C illustrates that for the second set of three access points, there are two contending access point pairs. FIG. 5D illustrates that for the final three access points, there are three contending access point pairs. The total fast evaluation metric for this situation is the sum of the contending access point pair counts for each channel, 3+2+3=7.

A small fast metric value is better than a large one. Frequency combinations that yield a small fast metric value can be expected to yield a large combined metric value. However, the fast evaluation metric can be calculated far more quickly.

In one implementation, the per-channel fast evaluation metric value is adjusted by adding a value equivalent to the square of the number of access points divided by 100. This beneficially maintains a more uniform distribution of access points across the channels in the optimized solution. This modification has been found to be particularly useful for 802.11a systems.

Another modification involves using a "soft decision" on whether an access point pair exceeds the threshold. Rather than simply counting access point pairs, a value is assigned to each access point based on a function of path loss that varies between zero and one. The function is zero for path losses that far exceed the threshold, one for path losses that are far below the threshold, and falls on a slope that is centered at the threshold. The function result can be understood as an indicator of the likelihood of contention. The total fast evaluation metric is then the sum of these values for the access point pairs.

Combined Metric

Figure 6:
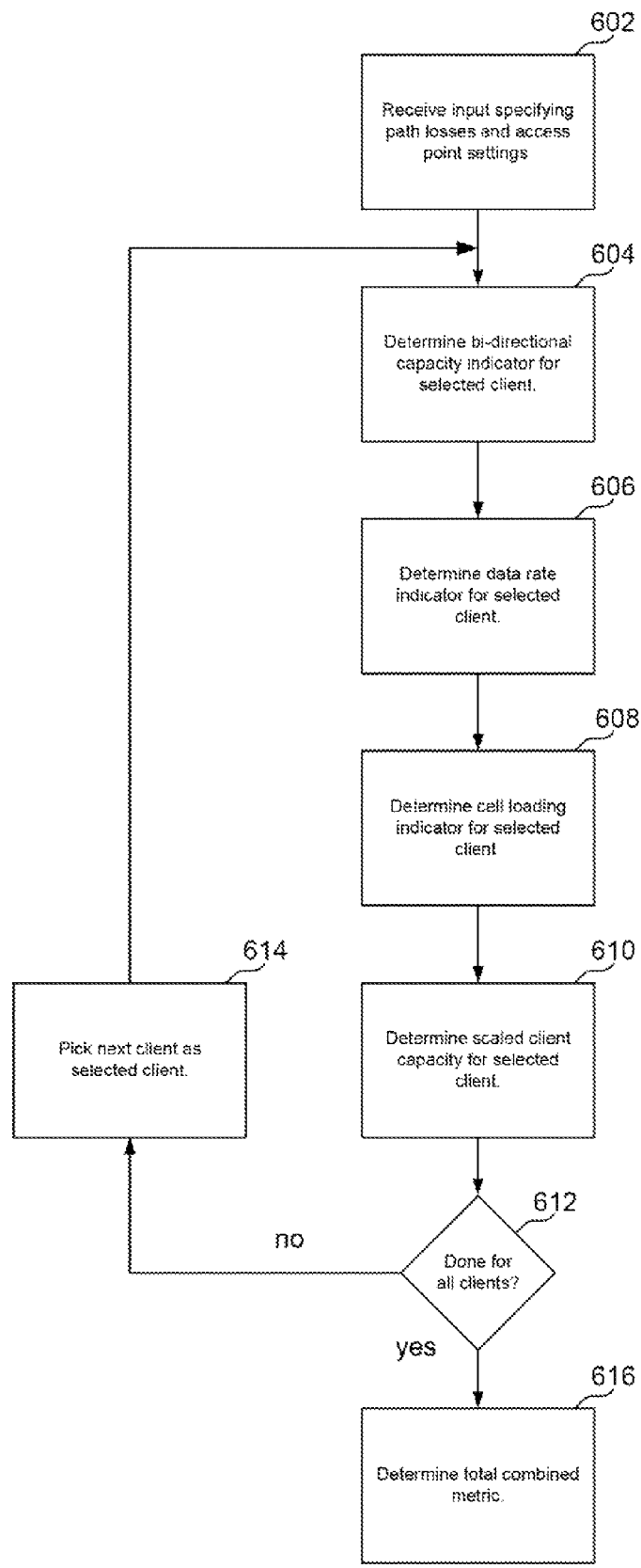
FIG. 6 is a flowchart describing steps of evaluating a combined network quality metric according to one embodiment of the present invention.

FIG. 6 is a flow chart describing steps of evaluating communication quality for the communication network according to one embodiment of the present invention. At step 602, the metric evaluation procedure receives input specifying path losses and access point settings. The path loss values indicate the path attenuation from a series of walkabout points to each access point as well as the attenuations between access points.

Some of the walkabout points will correspond to actual client locations or be used as proxies for client locations in the calculations that follow. The path loss values are preferably based on actual measurements rather than on propagation modeling. The access point settings include the channels of operation. For example, in one implementation, the channel set (1, 6, 11) is specified for each access point. It is also possible for the input to specify a particular channel set among several selections including, e.g. (1, 6, 11), (1, 4, 8, 11), or (1, 4, 6, 8, 11). The access point settings may also include a list of allowed data rates since access points may be configured to operate in only a subset of possible data rate modes.

A series of steps following step 602 are performed iteratively for each client. The term "client" as used herein is taken to also include walkabout locations taken as proxies for clients. Step 604 determines a bi-directional capacity indicator for a selected client. Capacity as defined in this context as how readily an access point can transmit data downstream to clients, or conversely how readily a client can transmit information upstream to the access point. Effectively, the bi-directional capacity indicator measures impairment due to likely contention or collision situations. Details of computing the bi-directional capacity for a selected client are described in detail below. The computation of the bi-directional capacity indicator incorporates an upstream capacity computation for the client and a downstream capacity compilation for the access point the client is associated with.

A step 606 determines a data rate indicator for the selected client. The received signal strength is mapped into a rate of data transfer between the client and the access point. Each possible data rate has a signal level above which data can be transferred reliably. The received signal strength is mapped to a physical layer data rate using a lookup table. That physical layer data rate is then converted into a MAC layer data rate using a lookup table such as the one that follows.

| Modulation Mode | Data Rate | Typical Rx Sensitivity (typical) | MAC Throughput |
| --- | --- | --- | --- |
| 802.11b | 1 Mb/s | −92 dBm | .75 Mb/s |
|  | 2 Mb/s | −86 dBm | 1.2 Mb/s |
|  | 5.5 Mb/s | −84 dBm | 2.3 Mb/s |
|  | 11 Mb/s | −77 dBm | 3.2 Mb/s |
| 802.11a | 6 Mb/s | −88 dBm | 3.4 Mb/s |
|  | 9 Mb/s | −79 dBm | 4.6 Mb/s |
|  | 12 Mb/s | −81 dBm | 5.4 Mb/s |
|  | 18 Mb/s | −78 dBm | 6.7 Mb/s |
|  | 24 Mb/s | −76 dBm | 7.8 Mb/s |
|  | 36 Mb/s | −69 dBm | 9 Mb/s |
|  | 48 Mb/s | −64 dBm | 9.7 Mb/s |
|  | 54 Mb/s | −60 dBm | 10.1 Mb/s |

Figure 12A:
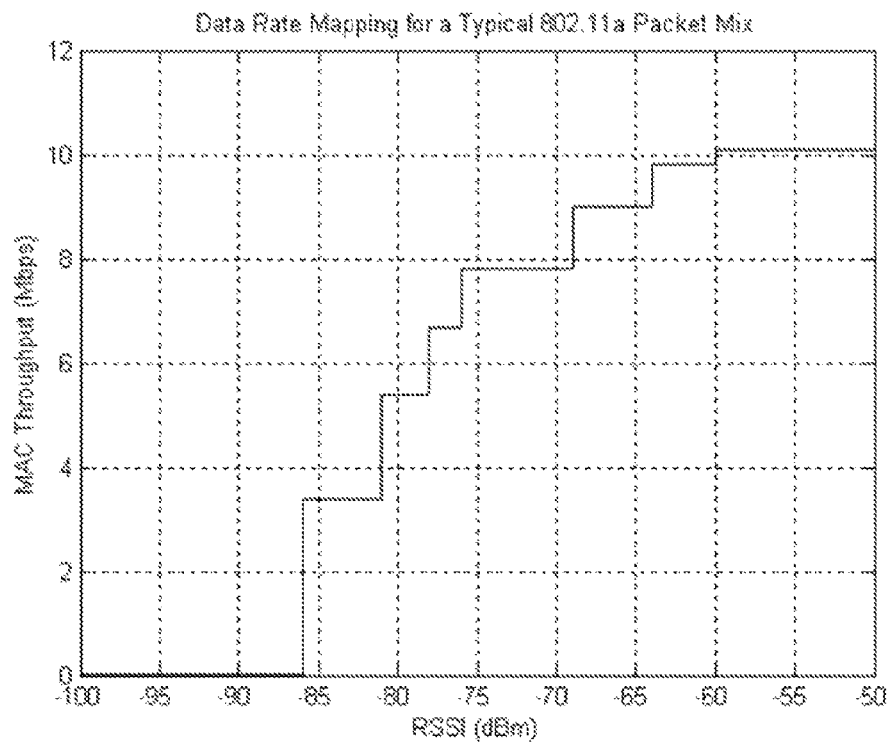
FIGS. 12A-12C depict data rate metrics for different variants of the 802.11 standard according to one embodiment of the present invention.
Figure 12B:
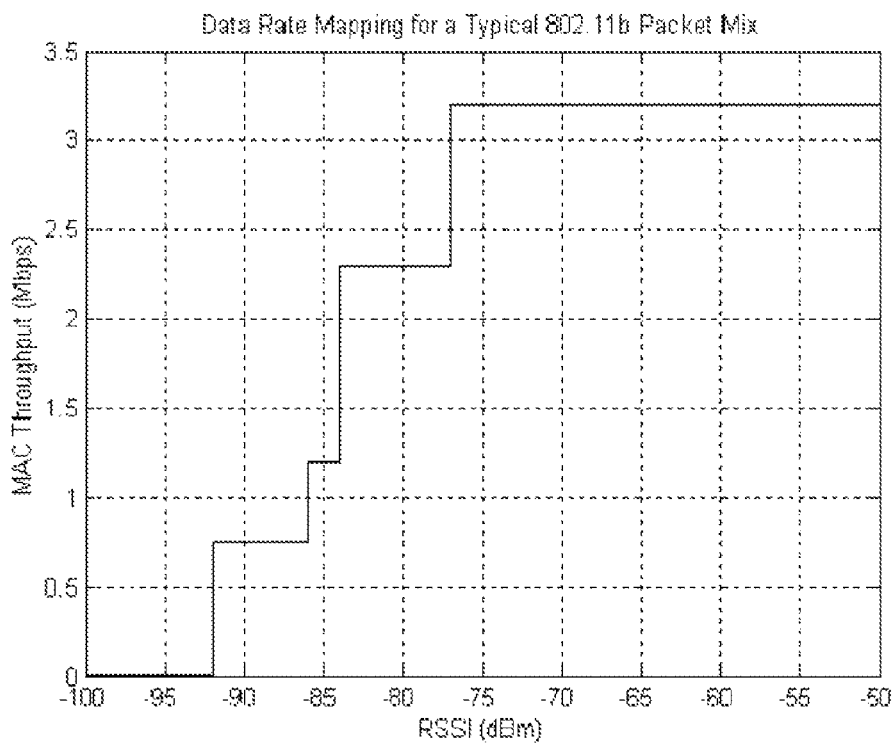
Figure 12C:
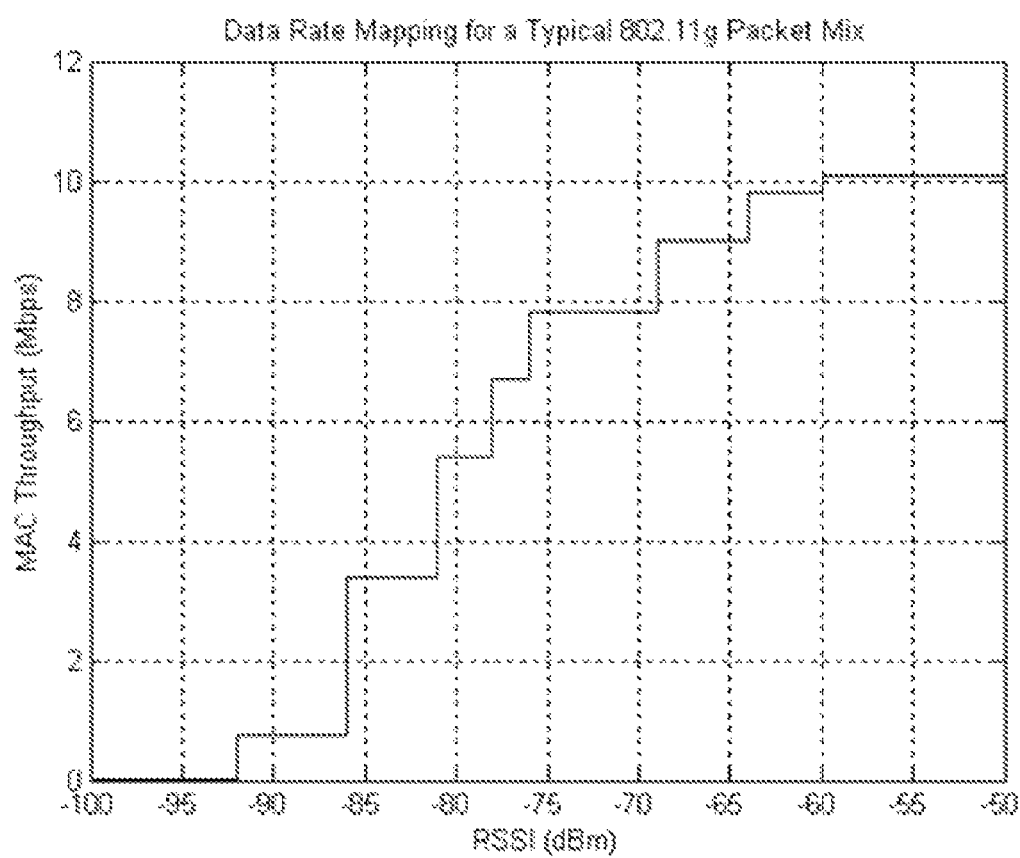

FIGS. 12A-12C graphically illustrate the relationships between receiver sensitivities and data rates for 802.11a, 802.11b, and 802.11g, respectively. The mapping of the physical layer data rate into the MAC layer data rate depends on the average packet size and the MAC protocol being used. Therefore the network performance can be optimized for voice (short 100 to 200 byte packets) or for large TCP-IP transfers (1536 byte packets). The above table and FIGS. 7B-7D are for a typical packet mix with a mean packet size of 364 bytes.

A step 608 determines a cell loading indicator for the selected client. Cell loading actually needs to be determined only once for each access point so it will be understood that the cell loading indicator for a client is in fact a cell loading indicator of the access point to which it is associated. The cell loading indicator accounts for a throughput drop that results when too many clients are associated to a single access point. The user of the evaluation procedure defines the maximum number of clients that can be associated to a single access point without performance degradation. Up to that maximum number, no degradation is experienced while beyond that number, the cell loading metric falls off proportionally to 1/(number of associated clients). Further details of cell loading are explained below.

The capacity, data rate, and cell loading indicators are used to provide a measure of the data throughput of each client. At step 610 determines a scaled client capacity for a selected client. The metrics are combined as follows:

Client Throughput=Client Bidirectional Capacity Indicator*Client Data Rate*Cell Loading Indicator.

The client throughput provides an estimate of the mean rate of data transfer between the client and its access point. The reciprocal provides a measure of the amount of time it will take to transfer large data records to and from a particular client.

A step 612 tests whether the calculations of steps 604-610 have been done for all clients in the network. If there are further clients for which to compute the appropriate indicators, step 614 picks the next client as the selected client and then execution returns to step 604. If scaled client capacity has been determined for all of the clients, then the metric computation reaches step 616 where a total combined metric for the network is determined. The combined quality metric is preferably defined as:

$$\frac{1}{\sum_{all\ clients} 1/\text{client throughput}}$$

The above combined metric is not exactly the same as the total network capacity. The combined metric gives more weight to client locations with poor performance than those with good performance. A network where 90% of the clients can receive 11 Mbps and 10% of the clients can receive nothing is penalized as compared to a network where 80% of the clients receive 11 Mbps, 10% receive 5.5 Mbps, and 10% receive 1 Mbps. Alternatively, a total network capacity may be determined as a mean of all of the scaled client throughputs times the total number of access points in the network:

Capacity Details

Capacity is defined for each access point, for each client location, and for the entire network. The evaluation procedure relies on assumptions as to the fraction of time that the fully loaded wireless medium transmits successfully in the uplink and downlink. Representative values are $P_U$=0.2 (probability that a transmission on that link will be upstream) and $P_D$=0.8 (probability that a transmission on that link will be downstream).

From the viewpoint of capacity, the ideal is a single access point and a few clients operating with no potential co-channel or adjacent-channel interference. Such a situation will yield a capacity measure of 1. Interference from other cells will lower the expected capacity for that cell to some value less than 1. The metric penalizes capacity when stations experience contention or collision. Capacity computations depend on received signal strengths. The received signal strengths are determined based on the transmit power and path losses that were input to the algorithm.

There are theoretically 9 different types of contention and collision that could occur within a cell. There are:

1. External access points contending with the access point attempting to transmit downstream.
2. External access point colliding with the access point attempting to transmit downstream.
3. External access point contending with a client attempting to transmit upstream.
4. External access point colliding with a client attempting to transmit upstream.
5. External client contending with an access point attempting to transmit downstream.
6. External client colliding with an access point attempting to transmit downstream.
7. External client contending with a client attempting to transmit upstream.
8. External client colliding with a client attempting to transmit upstream.
9. Client collides with another client in the same cell.

To alleviate the need for cumbersome client-to-client path loss measurements, the presently described evaluation procedure only takes into account the first 5 types of contention and collision. The use of the scaling factors $P_U$ and $P_D$ within the capacity calculations allows results based on only the first 5 types of contention and collision to serve as a realistic estimate of the desired capacity indicator.

First let us consider the downstream capacity of an access point. The downstream capacity of an access point is calculated as its ability to transmit downstream data in the presence of interference from other access points and clients from other cells. The access point capacity is expressed as a quotient where the numerator is always 1. In an ideal case, the denominator is also 1, but co-channel interference from other cells will increase the value of the denominator. As will be shown, the denominator will be equal to 1 plus the sum of various degradation indicators.

Figure 7:
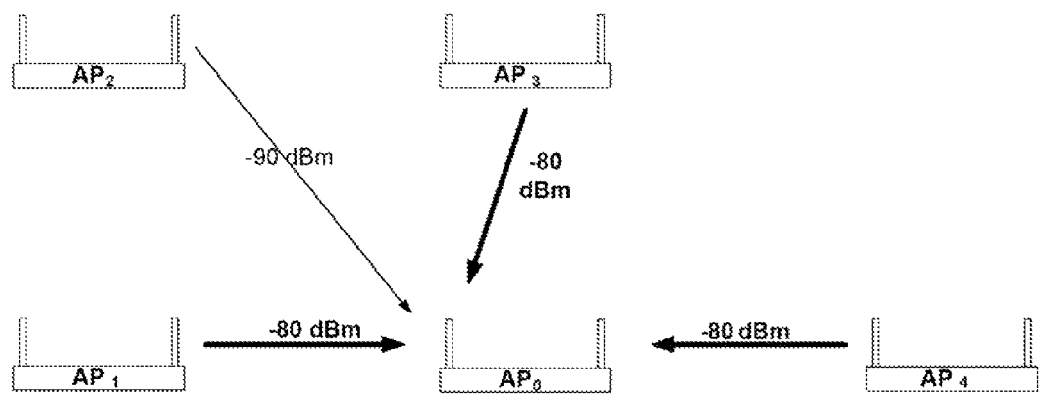
FIG. 7 depicts access point contention with other access points as evaluated by a combined metric according to one embodiment of the present invention.

The capacity calculation including the determination of various degradation indicators will be discussed with reference to a specific example. FIG. 7 shows access point contention with other access points. All 5 access points operate on the same channel and the receiver sensitivity for the minimum data rate mode is −85 dBm. The arrows show the received signal strengths at $AP_0$ for co-channel transmission by the other access points. The received signal levels are derived from the path losses and transmission powers that were input to the evaluation procedure. Signals transmitted by $AP_1$, $AP_3$, and $AP_4$ are all at −80 dBm, 5 dB above the receiver sensitivity of $AP_0$. Since $AP_0$ will hear these transmission before it attempts to transmit, $AP_0$ will not transmit when any of these three access points are transmitting. By contrast, signals transmitted from $AP_2$ arrive at $AP_0$ at −90 dBm, below the receiver sensitivity threshold. Therefore, contention with $AP_2$ will not degrade the downstream throughput. The degradation indicator for this type of contention is computed to be:

$P_d$*No_AP_Contend where $P_d$ is the probability of the contending access point wants to transmit, nominally set to 0.8; and No_AP_Contend=the number of transmitting access points that can be received by the access point of interest, 3 in our example.

In this example, the degradation caused by the other access points is 0.8*3=2.4.

Figure 8:
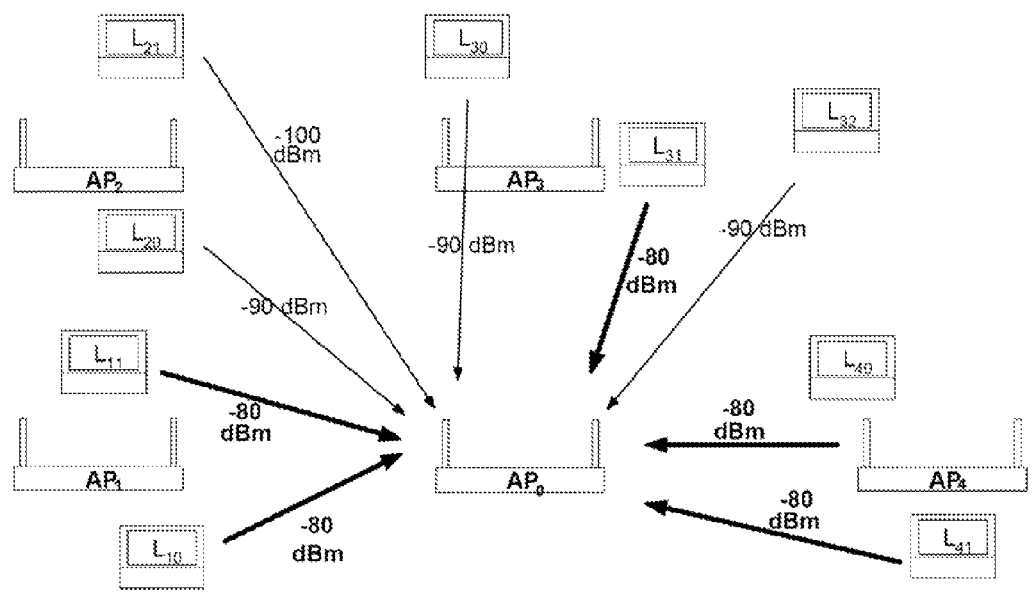
FIG. 8 depicts access point contention with clients as evaluated by a combined metric according to one embodiment of the present invention.

FIG. 8 shows downstream traffic degradation due to contention with clients associated with other access points. In this example, $L_{10}$ and $L_{11}$ are associated with $AP_1$, $L_{20}$ and $L_{21}$ are associated with $AP_2$, $L_{30}$, $L_{31}$, and $L_{32}$ are associated with $AP_3$, and $L_{40}$ and $L_{41}$ are associated with $AP_4$. The sensitivity of $AP_0$ is −85 dBm so transmissions from $L_{10}$, $L_{11}$, $L_{31}$, $L_{40}$, $L_{41}$ will cause $AP_0$ to wait to transmit its downstream data, thus degrading the quality of its downstream link. The quantitative measure of degradation caused by each potentially colliding client is calculated as:

$P_U$/Number of clients in the same cell.

So for $P_U$=0.2, the contending clients contribute as follows:
$L_{10}$=0.2/2=0.1
$L_{11}$=0.2/2=0.1
$L_{20}$=0, No Contention
$L_{21}$=0, No Contention
$L_{30}$=0, No Contention
$L_{31}$=0.2/3=0:067
$L_{32}$=0, No Contention
$L_{40}$=0.2/2=0.1
$L_{41}$=0.2/2=0.1

The sum of all the degradations caused by clients contending with $AP_0$ is 0.467.

Figure 14:
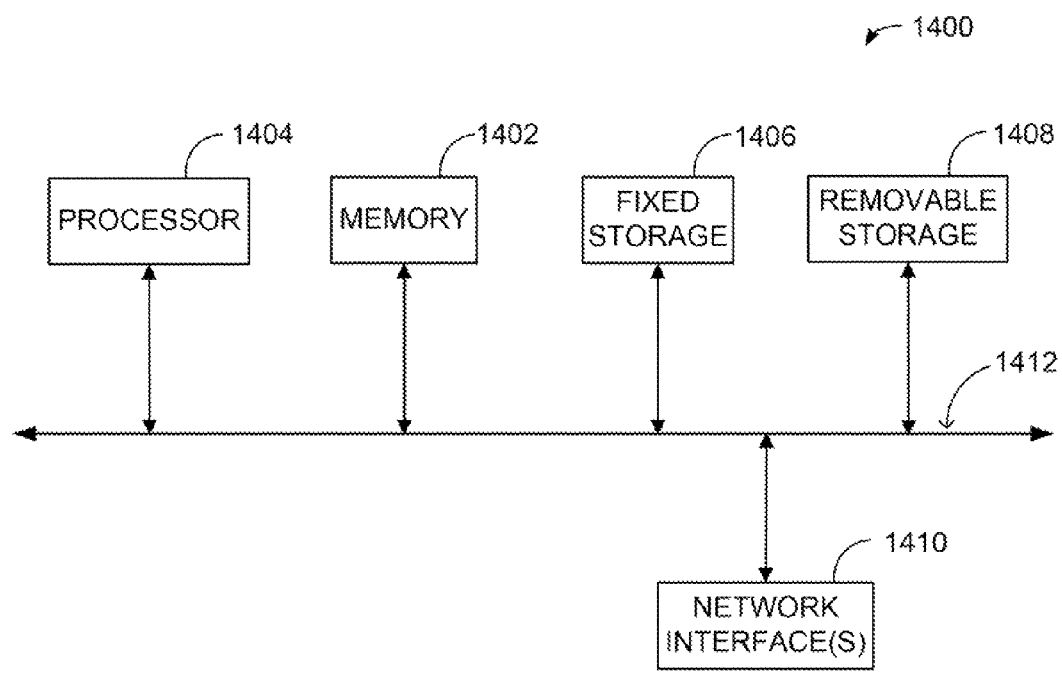
FIG. 14 depicts a computing system useful in implementing embodiments of the present invention.

FIG. 14 depicts access points colliding with other access points. In FIG. 7, it was shown that $AP_0$ would contend with $AP_1$, $AP_3$, and $AP_4$ for the channel, but it would not contend with $AP_2$ because the signal from $AP_2$ was too weak to be detected by $AP_0$. Therefore it is possible that $AP_2$ could be transmitting simultaneously with $AP_0$ since $AP_0$ will not know to delay its transmission. If the signal from $AP_2$ is strong enough to corrupt reception at the clients associated with $AP_0$, $AP_2$'s transmissions will potentially collide with downstream traffic from $AP_0$. The potential for collision is based on the needed carrier to interference ratio. This is determined by first calculating the received signal strengths at the access point and the client, then determining the physical layer data rate and required carrier to interference ratio by reference to a look-up table.

Figure 9:
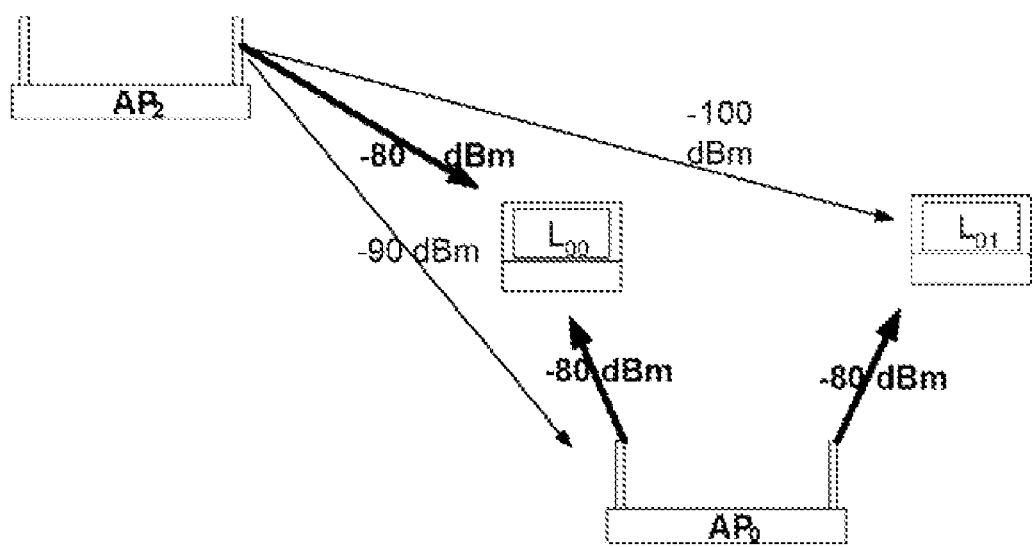
FIG. 9 depicts access point collision with other access points as evaluated by a combined metric according to one embodiment of the present invention.

Referring now to FIG. 9, if the clients $L_{00}$ and $L_{01}$ are operating in a data mode that requires 15 dB carrier to interference ratio, $L_{00}$ will experience collisions from $AP_2$ while $L_{01}$ will not. The first client, $L_{00}$ receives a signal of −80 dBm from $AP_0$ and it receives an interfering signal of −80 dBm from $AP_2$. The carrier to interference ratio is therefore 0 dB, and $L_{00}$ will therefore experience a collision. The client $L_{01}$ receives a signal of −80 dBm from $AP_0$ and an interfering signal of −100 dBm from $AP_2$, resulting in a carrier to interference ratio of 20 dB, sufficient to avoid a collision.

The degradation caused by these access point collisions from another access point is calculated as follows:

$$2 * \sum_{other\ access\ points} \frac{number\ of\ clients\ experiencing\ collisions\ from\ other\ access\ points}{number\ of\ clients\ in\ cell}$$

The summation is taken over all access points other than the access point whose capacity is being measured. In this example, there is only one access point causing a collision, so the total degradation is 2*(½)=1.

The total access point capacity is then computed as follows:

Numerator=1

Denominator=(1+Degradation due to access point to access point contention+Degradation due to access point to client contention+Degradation due to access point to access point collisions)

In this example, the capacity would be:
Numerator=1
Denominator=1+2.4+0.467+1=4.867
Access point capacity=1/4.867=0.205

Contention and collision from other cells will also cause a reduction in the upstream capacity of each client. Upstream client capacity can be degraded by contention from other access points as well as collision from other access points. Client contention from other access points occurs when signals transmitted from other cells arrive at the client and lead the client to believe its channel is busy, causing the client to delay transmission. Client collision from other access points is caused when signals transmitted from access points in other cells arrive at sufficiently weak levels such that the client transmits simultaneously, however, the carrier to interference ratio at the client's associated access point is too low for successful data recovery there. Similar to the access point computation, the client upstream capacity computation employs a ratio where the numerator is one and the denominator is one plus a sum of degradation indicators.

Figure 10:
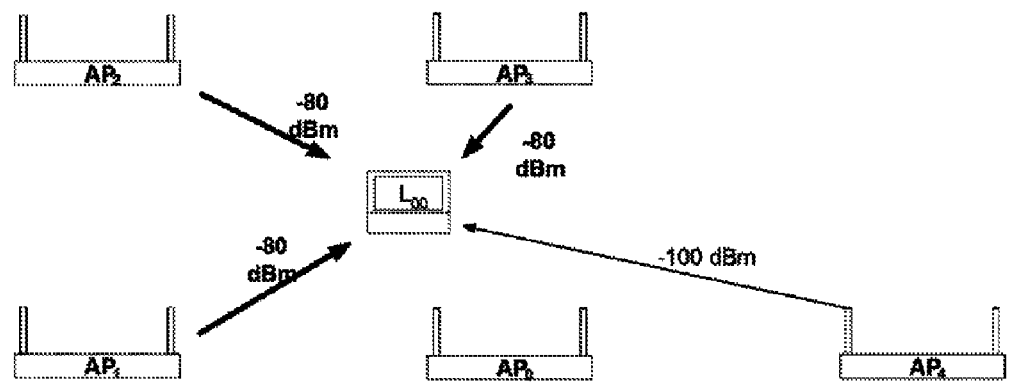
FIG. 10 depicts client contention with access points other than an access point associated with the client as evaluated by a combined metric according to one embodiment of the present invention.

FIG. 10 depicts client contention with other access points. The client at location $L_{00}$ wants to transmit data to $AP_0$ however, it can detect signals transmitted from $AP_1$, $AP_2$, and $AP_3$. It cannot hear signals transmitted from $AP_4$. Whenever $AP_1$, $AP_2$, and $AP_3$ are transmitting, $L_{00}$ delays transmission. The degradation caused by contention from other access points is evaluated to be equal to the number of access points from other cells that can be detected at the client. In this example, for $L_{00}$, the degradation is 3.

Figure 11:
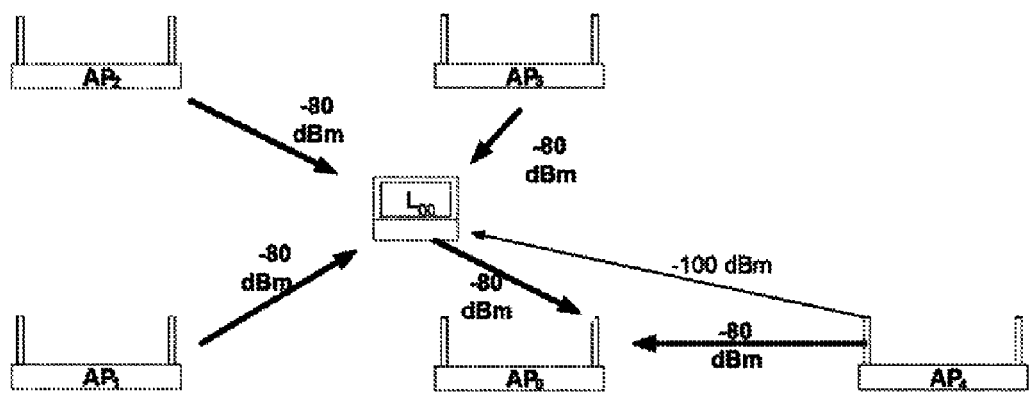
FIG. 11 depicts client collisions with access points other than an access point associated with the client as evaluated by a combined metric according to one embodiment of the present invention.

FIG. 11 depicts client collisions with access points other than the one it is associated to. Client $L_{00}$ hears signals transmitted from $AP_1$, $AP_2$, and $AP_3$ so it will delay transmission. However, $L_{00}$ will not hear signals transmitted from $AP_4$ so there is a potential for a collision. When client $L_{00}$ transmits to $AP_0$, the signal arrives at −80 dBm. If $AP_4$ transmit simultaneously, the carrier to interference ratio for the received client signal is 0 dB, insufficient for successful data recovery. The indicator for this type of degradation is computed to be 2 multiplied by the number of access points capable of causing a collision. An access point is capable of causing a collision if the signal from that access point received at the client's associated access point causes the received client signal carrier to interference ratio to fall below the threshold necessary for accurate reception. In this example, this expression is equal to 2 since there is one such access point capable of causing a collision.

The total upstream capacity for a client is calculated as follows:

Numerator=1

Denominator=1+Degradation caused by contention with out-of-cell access points+Degradation caused by collisions with out-of-cell access points.

In this example:
Numerator=1
Denominator=1+3+2=6
Total upstream client capacity=1/6 or 0.167.
The total bidirectional client capacity is then:

Associated Access Point Capacity* $P_d$+Client Upstream capacity*$P_u$

Where $P_d$ is nominally 0.8 and $P_u$ is nominally 0.2. In this example, the result is 0.1974. This is the value that is used in computing the scaled client capacity at step 110.

Cell capacity=access point capacity*$P_d$+mean client capacity*$P_u$. The mean client capacity is the average upstream client capacity for the clients associated with the access point of a cell.

Cell Loading

Cell loading is a measure of degradation caused by an excessive number of clients in a cell potentially contending for the same channel. The exact number of clients that can successfully share a channel in a cell depends on separately generated usage models. A parameter generated by such a usage model is max_clients which is the maximum number of clients in a cell before performance suffers as determined by the usage model. An additional parameter to be entered by the operator is mean_clients which is equal to the average number of clients in each cell.

First, the number of clients in each cell is estimated by: EST_CLIENTS=(number of walkabout points in cell/total number of walkabout points)*mean_clients. The capacity scaling factor due to overcrowding on an access point is then calculated as:

Cell_Loading_factor=max_clients/max(max_clients, est_clients)

Figure 13:
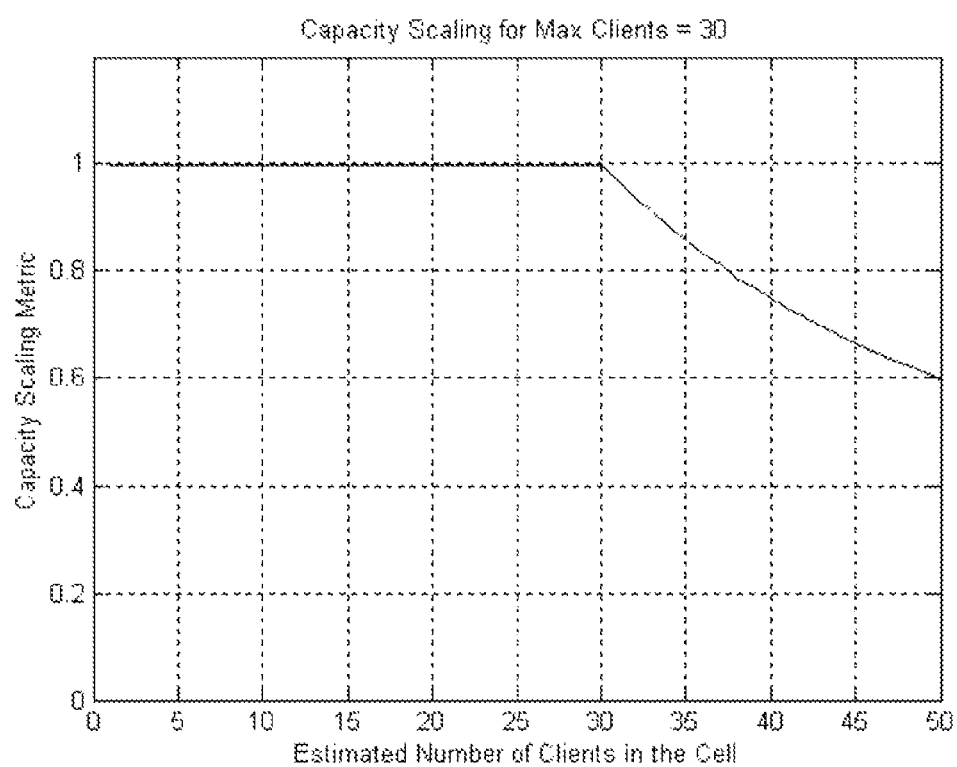
FIG. 13 depicts a cell loading metric used in evaluating a combined metric according to one embodiment of the present invention.

FIG. 13 depicts how the cell loading factor varies as the number of clients increases. When max_client is set to 30, there is no penalty until the number of clients exceeds 30. After that, the cell loading factor decreases proportionately to (1/number of clients).

Computer System Implementation

FIG. 14 shows a system block diagram of computer system 1400 that may be used to execute software of embodiments of the present invention. Computer system 1400 includes memory 1402 which can be utilized to store and retrieve software programs incorporating computer code that implements aspects of the invention, data for use with the invention, and the like. Exemplary computer-readable storage media include CD-ROMs, floppy discs, tape, flash memories, system memories, and hard drives. Computer system 1400 further includes subsystems such as central processor 1404, fixed storage 1406 and removable storage 1408, and one or more network interfaces 1410. Other computer systems suitable for use with the present invention may include additional or fewer subsystems. For example, computer system 1400 may also incorporate a display for displaying results and/or a keyboard for accepting input.

The system bus architecture of computer system 1400 is represented by arrows 1412 in FIG. 9. However, these arrows are only illustrative of one possible interconnection scheme serving to link the subsystems. For example, a local bus may be utilized to connect the central processor 1404 to the system memory 1402. Computer system 1400 shown in FIG. 14 is only one example of a computer system suitable for use with the invention. Other computer architectures having different configurations of subsystems may also be utilized.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. Logic encoded on one or more tangible non-transitory computer readable media for execution and when executed operable to: receive input path loss information indicating path losses among pairs of access points and frequency assignments for said access points; determine, for each of said pair of access points, likelihood of contention based on path loss between said pair and whether they share a common frequency assignment; and count a number of contending pairs of access points based on the likelihood of contention to determine a quality evaluation metric for said wireless network.

2. The logic of claim 1 wherein determining said likelihood of contention comprises determining whether a path loss between said access points is exceeded by a threshold.

3. The logic claim 2 wherein said threshold comprises a mean of maximum and minimum transmit power settings for said access points minus a receiver sensitivity of said access points.

4. The logic of claim 2 wherein said threshold comprises a mean path loss of all paths between said access points.

5. The logic of claim 2 wherein said threshold comprises a median path loss of all paths between said access points.

6. The logic of claim 1 further operable to assign transmission frequencies and transmission power levels in said wireless network.

7. The logic of claim 1 further operable to assign transmission frequencies and transmission power levels to said access points.

8. A method for assessing communication quality in a wireless network comprising a plurality of access points, said method comprising: receiving input path loss information indicating path losses among pairs of said access points and frequency assignments for said access points; determining, for each pair of access points, whether said access points contend by determining whether a path loss between said access points is exceeded by a threshold and said access points share a common frequency assignment, said threshold calculated based on path loss of all paths between said access points; and counting a number of contending pairs of access points based on the determining whether said access points contend, to determine a quality evaluation metric for said wireless network.

9. The method of claim 8 wherein said threshold comprises a mean of maximum and minimum transmit power settings for said access points minus a receiver sensitivity of said access points.

10. The method of claim 8 wherein said threshold comprises a mean path loss of all paths between said access points.

11. The method of claim 8 wherein said threshold comprises a median path loss of all paths between said access points.

12. The method of claim 8 further comprising assigning transmission frequencies and transmission power levels in said wireless network.

13. The method of claim 8 further comprising assigning transmission frequencies and transmission power levels to said access points.

14. An apparatus for assessing communication quality in a wireless network comprising a plurality of access points, comprising: means for receiving input path loss information indicating path losses among pairs of said access points and frequency assignments for said access points; means for determining, for each pair of access points, whether said access points contend by determining whether a path loss between said access points is exceeded by a threshold and said access points share a common frequency assignment, said threshold calculated based on path loss of all paths between said access points; and means for counting a number of contending pairs of access points based on the determining whether said access points contend, to determine a quality evaluation metric for said wireless network.

15. The apparatus of claim 14 wherein said threshold comprises a mean of maximum and minimum transmit power settings for said access points minus a receiver sensitivity of said access points.

16. The apparatus of claim 14 wherein said threshold comprises a mean path loss of all paths between said access points.

17. The apparatus of claim 14 wherein said threshold comprises a median path loss of all paths between said access points.

18. The apparatus of claim 14 further comprising means for assigning transmission frequencies and transmission power levels in said wireless network.

19. The apparatus of claim 18 wherein means for assigning transmission frequencies and power levels comprises evaluating a metric for possible frequency assignments to said pairs of access points.

20. The apparatus of claim 18 wherein means for assigning transmission frequencies comprises ranking said transmission frequencies.

* * * * *